United States Patent
Muller et al.

(10) Patent No.: US 6,790,400 B1
(45) Date of Patent: Sep. 14, 2004

(54) METHOD AND DEVICE FOR MAKING A CONTAINER PROVIDED WITH A LABEL

(76) Inventors: Paul A. Muller, deceased, late of Monaco (MC); Colette Potier-Muller, legal representative, 15 boulevard Louis II, Monaco (MC), MC-98000

( * ) Notice: Subject to any disclaimer, the term of this patent is extended or adjusted under 35 U.S.C. 154(b) by 0 days.

(21) Appl. No.: 09/403,329
(22) PCT Filed: Apr. 17, 1998
(86) PCT No.: PCT/FR98/00785
§ 371 (c)(1),
(2), (4) Date: Oct. 26, 2000
(87) PCT Pub. No.: WO98/47685
PCT Pub. Date: Oct. 29, 1998

(30) Foreign Application Priority Data

Apr. 18, 1997 (FR) .......................................... 97 05036

(51) Int. Cl.⁷ .............................................. B29C 45/14
(52) U.S. Cl. ...................... 264/267; 264/268; 264/275; 264/247; 425/127; 425/129.1; 425/387.1; 425/392; 425/403.1
(58) Field of Search ................................. 264/267, 513, 264/268, 247, 275, 509, 511, 516, 259; 425/127, 129.1, 387.1, 392, 403.1, 110, 588, 503, 504, 515, 521, 126.1

(56) References Cited

U.S. PATENT DOCUMENTS

| | | | |
|---|---|---|---|
| 3,559,248 A | * 2/1971 | Stockmann | ................. 264/275 |
| 3,602,496 A | 8/1971 | Langenohl et al. | |
| 4,479,771 A | * 10/1984 | Slat et al. | ................... 425/503 |
| 4,725,327 A | * 2/1988 | Matuda et al. | ............... 156/351 |
| 4,986,866 A | * 1/1991 | Ohba et al. | .................. 264/509 |
| 4,992,038 A | * 2/1991 | Furuse et al. | ............... 425/503 |
| 5,520,876 A | * 5/1996 | Dobler | ....................... 264/511 |
| 5,614,146 A | 3/1997 | Nakamura et al. | |
| 5,919,414 A | * 7/1999 | Dobler | ....................... 264/511 |
| 5,925,208 A | * 7/1999 | Dronzek, Jr. | .......... 264/211.12 |
| 6,007,759 A | * 12/1999 | Ten Tije et al. | ............ 264/268 |
| 6,159,568 A | * 12/2000 | Freedman et al. | .......... 264/509 |
| 6,264,876 B1 | * 7/2001 | Ballay | ..................... 425/126.1 |

FOREIGN PATENT DOCUMENTS

| | | | | |
|---|---|---|---|---|
| CH | 638 718 | | 3/1979 | |
| CH | 638 718 | | 10/1983 | ............. B29F/1/10 |
| EP | 0 331 596 | | 9/1989 | ........... B29C/45/14 |
| EP | 331596 A2 | * | 9/1989 | ........... B29C/45/14 |
| EP | 0 395 585 | | 10/1990 | ........... B29C/51/16 |
| EP | 546234 A1 | * | 6/1993 | ........... B29C/45/27 |
| FR | 2 651 460 | | 3/1991 | ........... B29C/45/14 |
| GB | 1 357 532 | | 6/1974 | ........... B29C/17/04 |
| JP | 05285981 A | * | 11/1993 | ........... B29C/00/00 |
| JP | 06270198 A | * | 9/1994 | ........... B29C/45/14 |

* cited by examiner

Primary Examiner—Edmund H. Lee
(74) Attorney, Agent, or Firm—Cohen, Pontani, Lieberman & Pavane

(57) ABSTRACT

The present invention relates to a method and to Apparatus for molding a receptacle fitted with a covering label. The technical field of the invention is that of molding a receptacle out of plastics material. In a method of molding a receptacle fitted with a covering label (1b) which is inserted into the mold (93) prior to injection, the label is shaped and at least two edges of the label are joined together, after which the shaped label is placed on a male portion (91) of the mold.

14 Claims, 12 Drawing Sheets

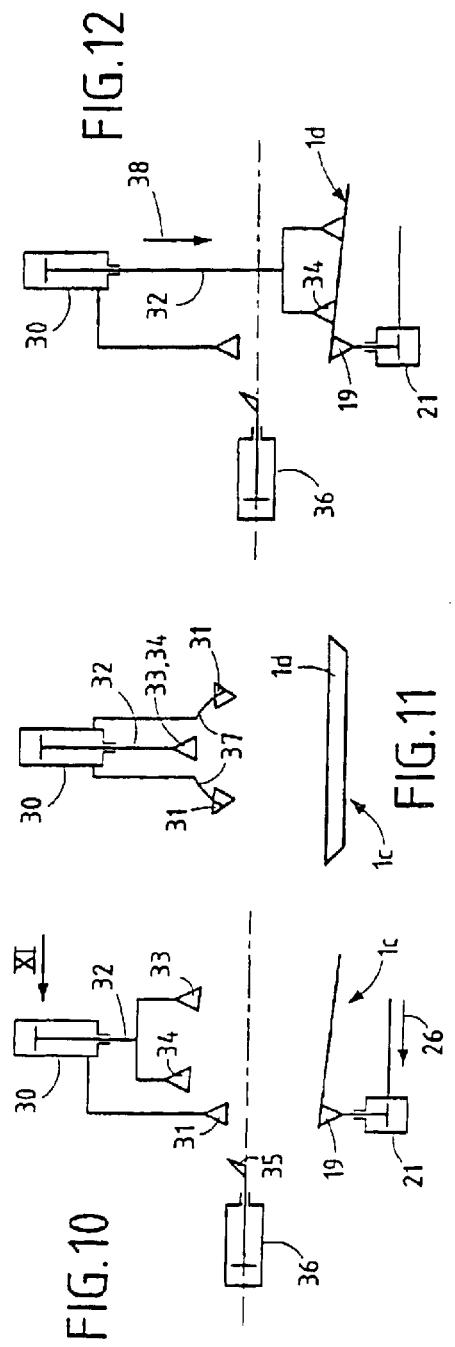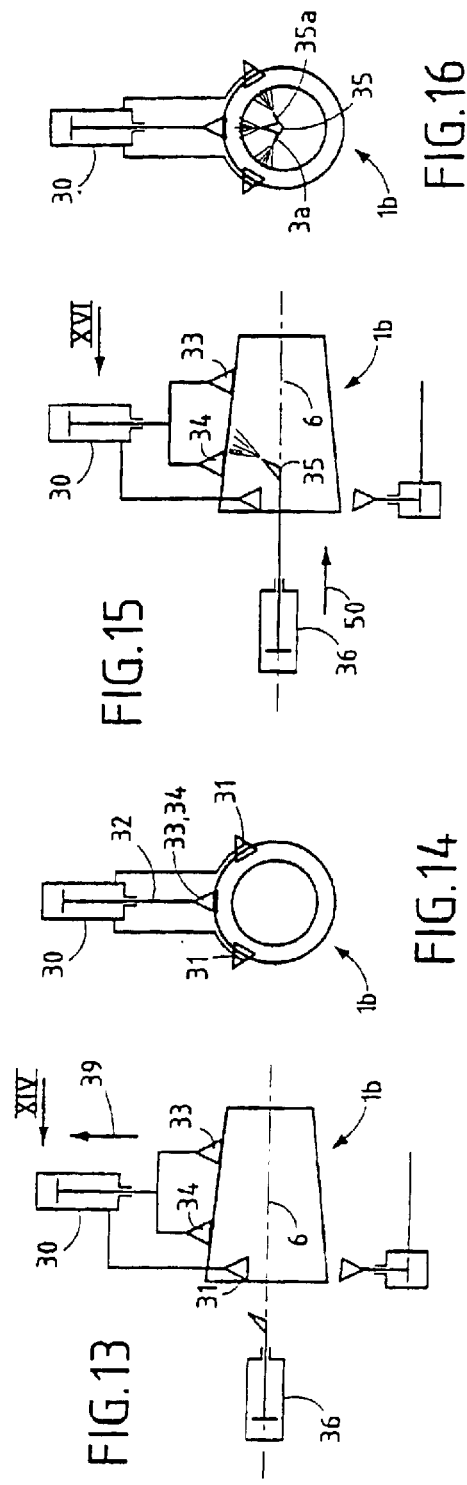

METHOD AND DEVICE FOR MAKING A CONTAINER PROVIDED WITH A LABEL

PRIORITY CLAIM

This is a U.S. national stage of application No. PCT/FR98/00785, filed on Apr. 17, 1998. Priority is claimed on that application and on the following application: France, Application No.: 97/05036, Filed: Apr. 18, 1997.

BACKGROUND OF THE INVENTION

The present invention relates to a method and apparatus for molding a receptacle fitted with a covering label.

DESCRIPTION OF THE RELATED ART

The technical field of the invention is that of molding a receptacle out of plastics material.

The invention applies particularly to the method of manufacturing a plastic material package covered by a label over a portion of at least one face, in particular a portion of an outside face; more particularly, The invention relates to packages such as boxes, pots, bottles, or tubes (e.g. for receiving gases, liquids, or pastes, in particular foodstuffs such as yogurt) where the substantially one-piece structure body can have a bottom-forming wall and one or more side walls e.g. extending over a surface of revolution about an axis perpendicular to the plane of the bottom, such as a cylinder or a truncated cone; the invention applies more particularly, to such packages or receptacles that are of relatively small size, i.e. in which the largest dimension is less than one meter, e.g. of the order of 5 cm to 30 cm.

The invention applies to this type of package as obtained by molding, generally injection molding of plastics materials, in a mold that has at least two portions that move relative to each other: a female portion or "matrix" that has at least one cavity corresponding to the outside shape of the receptacle that is to be manufactured, and a male portion or "core" that has at least one projecting portion corresponding to the inside face of the receptacle that is to be manufactured.

The invention also applies to such packages where the label is secured to the plastics material body by adhesion obtained by molding over the label, i.e. by inserting the label into the mold prior to the plastics material that is to form the body of the package itself being introduced into the mold; The label is of a shape that matches the final shape of the package, and it is generally obtained from a sheet of paper or plastics material such as polypropylene in particular, which is cut out to the desired shape and covered in patterns by any conventional printing method.

In general, prior to each molding cycle, a plane label (i.e. a label that is disposed flat) is transferred to a mold, e.g. by a clamp and/or suction cup system, generally from a magazine that contains a stack of labels, and there are two main techniques for doing this;

A first technique uses a transfer tool (or mandrel) of a shape that is suitable for penetrating into the inside of the mold matrix. The initially plane label is placed around the mandrel and is simultaneously deformed so as to take up the outside shape of the mandrel; The label deformed in this way is held in contact with the outside face of the mandrel by applying electrostatic forces or by establishing suction (by sucking air) at the outside face of the transfer mandrel, i.e. beneath the label; After the transfer mandrel carrying the label has been moved from the storage magazine to the inside of the cavity of the matrix, the means for holding the label on the matrix (electrostatically or by suction) are deactivated; the label tends to return to its initial plane shape because of the relative stiffness of the material(s) from which it is made, so it separates from the transfer mandrel and comes into close contact with at least a portion of the faces of the cavity-forming female portion of the mold; After the mandrel has been removed from the cavity and the core (or punch) has penetrated therein, plastics material is introduced into the space between the core and the matrix and also into the space between the core and the label, thus causing the label to be pressed against the walls of the matrix under drive from the forces exerted thereon by the injected plastics material.

Patent FR 2 627 744 (Gizeh Sarl) describes another technique for automatically manufacturing a receptacle with a covering label in which labels are transferred from the magazine to the mold by two rotary clamps which roll the label up into the form of a cornet, the label as rolled up in this way being taken hold of by a transfer clamp which inserts the label in the mold matrix. The rotary clamps roll the label up into a cornet by causing the free ends of the label to overlap, and the label rolled up into the shape of a cornet is then taken hold of where its free ends overlap by the transfer clamp which inserts the rolled-up label into the matrix.

Those known techniques have the drawback of generally requiring the matrix to be fitted with suction means for holding the label in place in the cavity until the plastics material is injected.

Another drawback of methods in which a transfer mandrel is used is the lack of accuracy with which the label is positioned on the mandrel, and the way the label deforms during and after being put into place on the transfer mandrel; This drawback is not resolved by the above-mentioned French patent; consequently, the positioning of the label in the mold cavity lacks precision, and that leads to receptacles being manufactured that are defective because the label is in the wrong position.

Another major drawback is that accurate handling and positioning of the Label by clamps or suction cups is not possible when the label is very thin, e.g. having a thickness of less than 80 microns; Labels that are that thin are fragile and difficult to handle, and they tend to deform and/or move in uncontrolled manner under the effect of their own weight or under the effect of the mechanical stresses caused by mechanical contact between the labels and the handling members (even though attempts are made to minimize those forces), or indeed under the effect of electrostatic forces; In addition, their small thickness gives rise to small stiffness and that can be insufficient to enable the label to separate spontaneously from the mandrel or other transfer means, which can prevent positioning and holding in the cavity of the matrix or which can at least make it more difficult, or indeed which can require holding forces to be applied thereto by auxiliary means such as electrostatic means or pneumatic means (operating by suction).

Unfortunately, it is advantageous in some cases, in particular for the purpose of keeping down costs, to use labels having thickness of the order of 10 microns to 40 microns.

SUMMARY OF THE INVENTION

The object of the invention is thus to propose an improved method and apparatus for automatically manufacturing packages or receptacles that include a label.

An essential object of the invention is to provide such methods and corresponding apparatuses for implementing them to make it possible to provide a package manufacturing cycle time that is as short as possible; the time required for injection (which can lie in the range of a few seconds to a few minutes depending essentially on the dimensions of the package) is penalized (i.e. lengthened) by the time required for transferring the label into the mold, which time can be greater than 5 seconds when a mandrel is used.

From this point of view in particular, the system for transferring labels from the magazine to the mold by means of members such as mandrels or clamps not only leads to mechanical structures that are complex and expensive (and which also need to be adapted to the shape of each label and thus need to be interchangeable in order to manufacture receptacles in a range of shapes or sizes), but they also increase cycle time and slow down manufacturing throughput.

For example, transfer devices which have electrostatic means for holding the label on a mandrel suffer from a drawback which is due to the use of electrical voltages for causing labels to adhere by the electrostatic effect on the receiving portions of the transfer means, thereby giving rise to electromagnetic disturbances to the operation of the apparatus, and they are also incompatible with thin films.

In addition, known transfer devices do not make it possible to position the free edges of the label so that they are accurately in register, i.e. edge to edge, or they are poor at so doing, thus giving rise to a resulting receptacle suffering from poor appearance and which is fragile.

The problems mentioned are made worse when it is desired to use molds that have a plurality of cavities; since the use of such molds gives rise to additional constraints in design (and use) because of the small amount of space left free between two consecutive cavities through which a label can be transferred into the mold, thereby leading to complex transfer systems being designed, and usually to the detriment of the time required to transfer a label from the magazine to the mold cavity.

In a first aspect, the invention consists in forming a label so that it takes up its final shape or at least an intermediate shape that is not planar, i.e. a shape that is three-dimensional or that occupies volume, in joining together at least two free edges of the label (or indeed two portions thereof, e.g. two small "spot" zones of the label that are situated close to the free edges thereof). This is accomplished preferably by heat-sealing or adhesive so that the edges are either in an edge-to-edge configuration or else have an overlap margin, and then in placing the label that has been pre-shaped in this way on a male portion (or core) of the mold.

In other words, the invention consists in proposing a method of molding a receptacle fitted with a label covering the receptacle, in which the label is rolled up before it is inserted into the mold, the method being characterized in that the label is stabilized in its final shape or in an intermediate (non-planar) shape, e.g. a shape in which it is rolled into a cylinder or a truncated cone, by joining together at least two portions of the label (preferably by adhesive or by heat-sealing), and then the stabilized shaped or pre-shaped (e.g. rolled) label is engaged on a male portion (or core) of the mold, after which the core is brought up to the matrix with the core serving as a support for the label. The plastics material is injected.

Because the label is put into place on the core rather than in the matrix, manufacturing cycle time can be reduced, for several reasons, and in some cases their effects can be cumulative.

First it is possible to put the label into place in "non-critical" time, i.e. simultaneously with the operation of withdrawing the receptacle manufactured during a previous manufacturing cycle from the matrix.

Second it is also possible to engage the label (on the core) part of the way only by means of a first transfer member, and then to continue the engagement operation by means of a second transfer member; this final engagement operation can consist merely in moving an abutment linearly in translation along a longitudinal axis of the core (the axis of revolution for a frustoconical core) in order to push the label along said axis; This operation therefore avoids any need to activate or deactivate mechanical, pneumatic, or electrostatic means for gripping the label by the transfer member and/or for holding the label on the core; in addition, return (along a return axis) of the transfer members to take hold of a new pre-shaped label does not require the transfer members to perform a disengagement movement relative to the core along an axis other than the return axis.

Third this saving in time together with accurate positioning of the label on the core is also favored by the fact that the pre-formed label is stiffer, at least in one of the three dimensions, and therefore less liable to become deformed, than is a flat sheet constituting a label blank, i.e. a label that has not been pre-shaped and that has not been joined together; Because of this "intrinsic" stiffness of a shaped label, which is greater than the stiffness of a flat label sheet (not yet joined together), it is possible to use labels of reduced thickness.

Because it is possible to omit electrostatic means for holding the label on the core (or punch), it is possible to place the pre-shaped label on male mold portions that are very close together in a multi-cavity mold; This possibility is also favored by the fact that the size of the pre-formed label (in at least one of the three dimensions) is smaller than the size of a "flat" label blank.

In multi-cavity molds, the space available between two adjacent cavities and/or the pitch at which the cavities are spaced is generally smaller than the dimensions of the label when flat; under such circumstances, there is specifically no question of using electrostatic forces for rolling a flat label around a core.

In preferred embodiments of the invention, the pre-shaped label is deformed and/or folded so as to flatten it, thereby enabling it to be stored flat. The previously shaped and flattened label is then again deformed and/or opened or expanded, e.g. by blowing, thereby giving it again a shape that is close to its final shape as previously imparted thereto, and the reshaped label is transferred into the mold by being deposited on the core.

In other words, the label as previously rolled-up (or shaped) and joined-together (via at least two edge zones) and then flattened is stored flat and/or in a stack in a magazine. The label is then extracted from the magazine, and then caused to go from its rolled-up and flattened shape (or configuration) to a rolled-up and non-flattened configuration, preferably by being expanded by blowing.

To transfer the label into the mold, the pre-shaped label (rolled up and expanded) is placed or engaged (preferably in part only) on a mold core or punch, and the final positioning of the label around the core is performed by a thrust member (such as an actuator) which is movable relative to the transfer member (such as an actuator); This makes it possible to reduce the total cycle time required to manufacture the receptacle by enabling the transfer member(s) to move back towards the magazine preferably in a single direction (or axis) only, since there is no need to disengage the thrust member.

During the operation of shaping or rolling up the label prior to storing it flat, the two free edges of the label are joined together by adhesive or heat-sealing, either with the two free edges overlapping or else without overlap, i.e. edge to edge.

The labels used are made of paper, polypropylene, polyethylene, PVC, or ABS, having a thickness of not more than 80 microns, e.g. a thickness of not more than 50 microns; and The total time required to transfer a label from a ready position outside the mold to a position where it is installed on the core, and including the return time, can be less than or equal to 5 seconds, preferably less than or equal to 3 seconds, e.g. about 1 to 2 seconds.

In another aspect, the invention consists in providing apparatus for molding a receptacle and for inserting a covering label into the mold, the apparatus being characterized in that it includes means for transferring and/or depositing a pre-shaped label on a male mold portion, the pre-shaped label having two zones (or edges) that have been previously joined together.

In preferred embodiments, the apparatus includes;

a storage magazine or means for storing rolled-up; shaped, and flattened or folded labels flat and/or in a stack; and/or The shaping means, preferably operating by expanding a label from a rolled-up and flattened state (or shape) to a rolled-up and non-flattened state (or shape); and/or means for expanding a rolled-up and flattened label by blowing, which means preferably include a plurality of nozzles pointing in different directions;

In the alternative, expansion can be obtained by radially deploying a mechanical hinged structure which pushes back the side walls of the label from the inside;

The apparatus may further include at least one means such as a suction cup, for pneumatically taking hold of a label by making contact with an outside face of the shaped and expanded label;

The apparatus may have means for transferring the label as extracted from the magazine and as expanded from the magazine to the mold and for placing it on the core, and preferably the apparatus includes distinct means for pushing against a label that has previously been engaged in part around the core.

The apparatus may include a magazine for storing a stack of labels fitted with means enabling labels (that have already been shaped, joined-together, and flattened) to be introduced to the top of the stack, The magazine can be fitted with means situated in the bottom portion of the stack and enabling shaped, joined-together, and flattened labels to be extracted therefrom (preferably one by one); and the means for transferring the expanded label can include a plurality of gripping means that operate by making contact with the outside face of the label, such as suction cups.

BRIEF DESCRIPTION OF THE DRAWINGS

The advantages provided by the invention will be better understood from the following description which refers to the accompanying drawings which show, in non-limiting manner, preferred embodiments of the invention.

FIG. 3 is a view on the III—III line of FIG. 4.

FIGS. 10 to 16 show the successive operations of expanding a label that has been shaped, joined together, and folded so as to return it to its initial and/or final shape.

FIGS. 11, 14, and 16 are views looking along lines XI, XIV, XVI respectively in FIGS. 10, 13, and 15.

FIGS. 21, 23, 25, 27, and 30 are diagrammatic plan views of the magazine and of the intermediate support.

FIGS. 22, 24, 26, and 29 are diagrammatic side views seen along XXII, XXIV, XXVI, XXIX respectively of FIGS. 23, 25, 27 lines, and 30.

FIG. 28 is a diagrammatic side view in an intermediate position or step between those shown in FIGS. 26 and 29.

FIG. 32 is a side view on line XXXII of FIG. 31 which is a plan view.

DETAILED DESCRIPTION OF THE PREFERRED EMBODIMENTS

Figure 1:
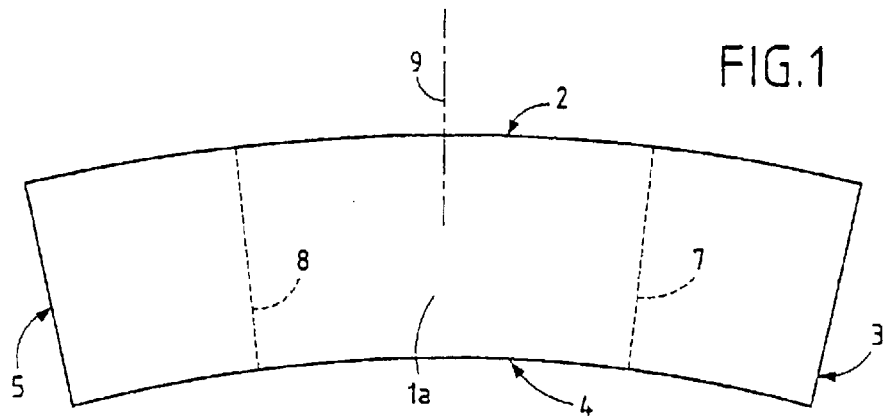
FIG. 1 is a flat view of a piece of sheet for constituting a frustoconical label as shown more particularly in FIGS. 2 to 4.
Figure 4:
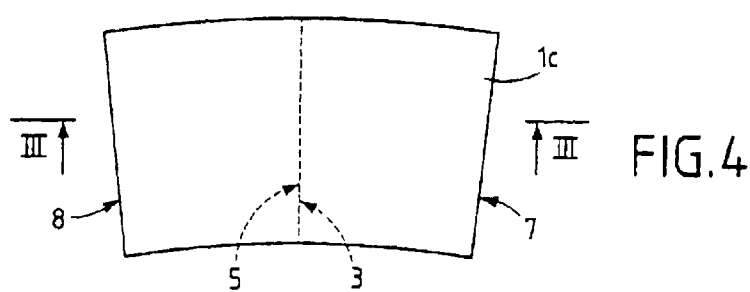

With reference to FIGS. 1 and 4 in particular, the shaped label 1*b* of frustoconical shape about an axis 6 of revolution is obtained from a sheet 1*a* cut out to have two circularly arcuate edges 2 and 4 and two rectilinear edges 3 and 5 that are symmetrical about an axis 9 on which the centers of the circular arcs traced by the edges 2 and 4 can be located; The unfolded or flat sheet 1*a* of FIG. 1 is thus in the form of a curvilinear quadrilateral having an axis of symmetry 9.

Figures 2, 5:
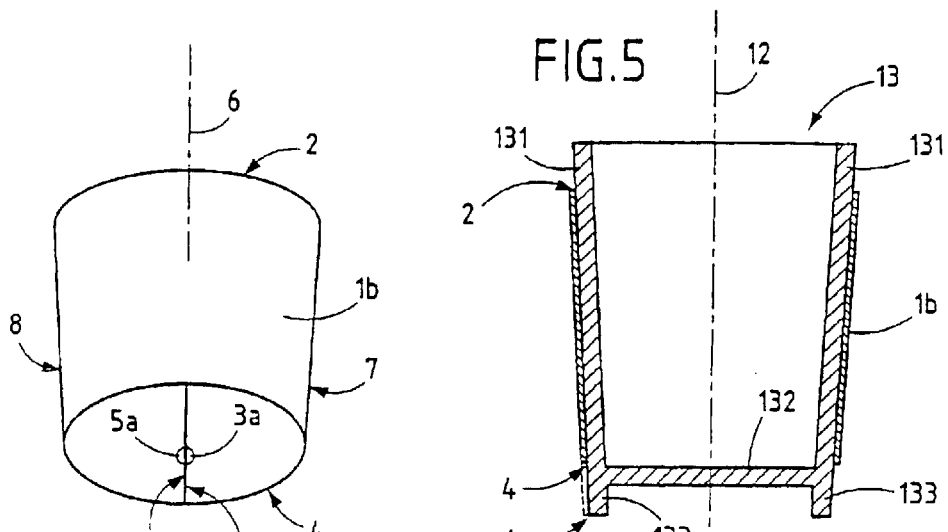
FIG. 2 is a diagrammatic perspective view of the label in the form of a frustoconical sleeve.
FIG. 5 is a section view on a longitudinal plane of a frustoconical receptacle having an end wall and fitted on its outside face with a label that fits the frustoconical shape of its side walls.

With reference more particularly to FIG. 2, at least one portion 3*a* (or 5*a*) of each free rectilinear edge 3 and 5 of the sheet 1*a* forming the label blank shown in FIG. 1 can be secured to the other by adhesive or by heat sealing (particularly when the sheet is made of plastics material), so as to join the free edges 3 and 5 together, e.g. in an edge-to-edge configuration; moving the edges 3 and 5 of the sheet together results in the label blank shown in FIG. 1 being rolled into a sleeve shape 1b or shaped label as shown in FIG. 2, which sleeve or label is frustoconical in shape about the axis 6 and where the lines 7 and 8 that are dashed lines in FIG. 1 constitute generator lines of the frustoconical-formed label 1b; The generator lines 7 and 8 can be fold lines whereby the shaped label 1b can be flattened to obtain the label 1c (shown in FIGS. 3 and 4) by applying a flattening force across the label in the direction of arrow 10; This gives rise to a joined-together, shaped, and flattened or folded label 1c which is essentially constituted by two identical portions 1d and 1e that face each other, each portion, when flat, having the shape shown in FIG. 4.

With reference to FIG. 5, the label in its shape as shown in FIG. 2, which is substantially its final shape, is intended for fitting to the outside face of the side walls 131 of a frustoconically-shaped receptacle 13 having an axis of revolution 12, and which may be fitted with an end wall 132, the side walls 131 extending close to the end wall 132 in the form of stand-forming flanges 133, and only the top portion (situated above the end wall 132) of the receptacle 13 being intended to receive the product for which this packaging is designed. As shown in FIG. 5, the bottom edge 4 of the label 1b can terminate above the stand 133 of the packaging 13, as shown in solid lines, or it can extend to the bottom of the stand 133 of the packaging, in the configuration as shown in dashed lines.

With reference to FIGS. 6 to 9, a magazine for storing labels that have already been shaped, joined-together, and folded, which labels are referenced 100, 103, 104, is constituted by preferably vertical side walls 14, a bottom wall 15, e.g. a wall that is horizontal and fixed, and a top wall 16 that is weighted, for example, and that is mounted to slide preferably vertically by means of a sliding guide 17 so as to move the stack of labels 100, 104 on which it rests downwards (as the folded labels contained in the storage magazine are extracted from the bottom portion thereof).

Figure 6:
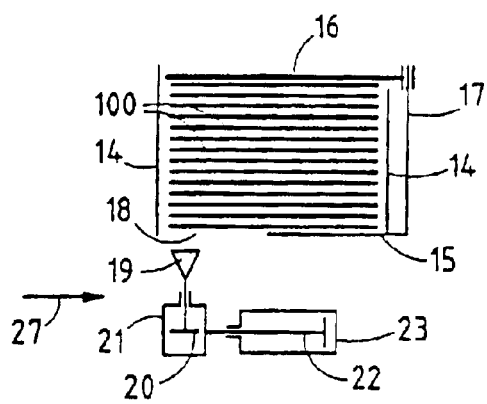
FIGS. 6 to 9 are diagrammatic side views of the successive steps of extracting a shaped and folded label from a magazine containing a stack of identical labels.

As shown in these figures, which relate to successive operations performed in extracting a shaped and folded label 103 from the magazine, said label being situated at the bottom of the stack of labels 100 contained in the magazine, a first step shown in FIG. 6 consists in positioning a suction cup 19 in register with an opening 18 provided in the bottom wall 17 of the magazine, said suction cup being mounted on the end of a rod (or piston) 20 of a gripping actuator 21; The actuator is mounted to move at the end of the rod (or piston) 22 of a second actuator 23 for moving the actuator 21 in horizontal translation along arrow 27.

Figure 7:
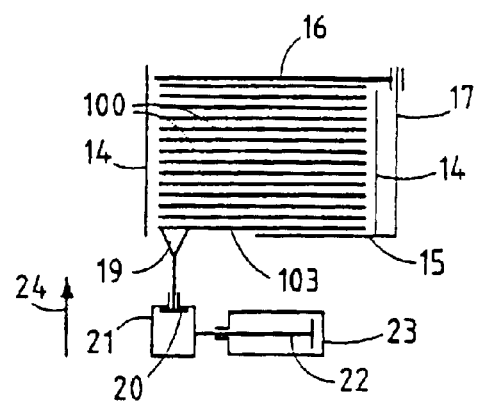

In the operation shown in FIG. 7, the actuator 21 is actuated so that the suction cup 19 moves vertically upwards along arrow 24 until it comes into contact with the bottom face of the shaped and folded label referenced 103 situated at the bottom of the stack of labels contained in the magazine, contact being made through the opening 18 provided in the bottom wall 15 of the magazine.

Figure 8:
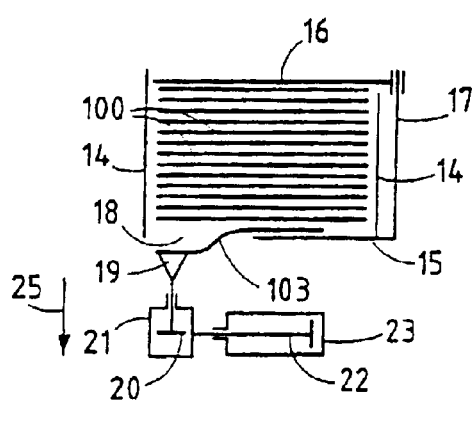
Figure 9:
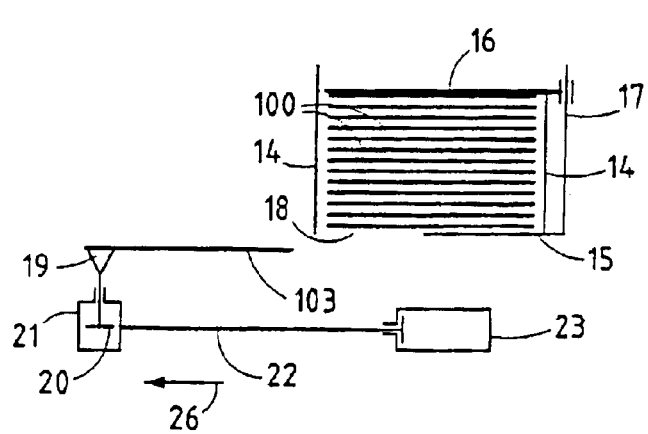

In the operation shown diagrammatically in FIG. 8, the suction cup 19 to which the label 103 situated at the bottom of the stack is adhered moves in the opposite direction along arrow 25 and begins to extract the label 103 from the magazine; This extraction is continued by horizontal movement along arrow 26 of the rod 22 supporting the actuator 21 until the shaped and folded label 103 has been fully extracted.

This label can then be subjected to the operations shown diagrammatically in FIGS. 10 to 16 which are applied in succession so as to expand the label back to a shape close to its original shape (i.e. its shape before it was folded) and which corresponds to a shape close to its final shape when fitted to the packaging, which shape enables it subsequently to be inserted into a mold by being engaged on the core as shown in FIGS. 17 to 20.

With reference to FIGS. 10 to 16, the apparatus of the invention can include means for deploying or expanding a previously shaped, joined-together and folded label from its folded or flattened shape to an unfolded shape, prior to depositing it on the core of the mold.

With reference to FIGS. 10 and 11 in particular, these means enabling the label to be deployed or unfolded can essentially comprise a first actuator 30 suitable for moving one or more suction cups 33 and 34 secured to a rod 32 along a vertical axis by moving the rod 32; In addition, suction cups 31 are secured to the cylinder of the actuator 30 by two rods or arms 37 whose bottom portions are symmetrically curved as a function of the shape to be given to the label; The label is presented to the deployment station in its folded shape referenced 1c by the actuator 21 (described above with reference to the preceding figures) which is fitted with a suction cup 19 to which the bottom face of the folded label 1c adheres.

The apparatus further includes blower means 35 preferably fitted with a plurality of nozzles 35a, e.g. nozzles that are uniformly distributed and suitable for generating radial jets of air as shown in FIG. 16 in particular, the jets extending away from an axis along which the blower means 35 can be displaced by means of an actuator 36, which axis corresponds to the longitudinal axis 6 of the label in the deployed state.

With reference to FIGS. 10 and 11, when the label is presented to the deployment station by the translation movement along arrow 26 as imparted by the transfer actuator 21, the label is thus presented in register with the suction cup means 31, 33, and 34; In a first step shown to FIG. 12, the suction cups 33 and 34 secured to the rod 32 are moved in downward vertical translation 38 by the actuator 30 so as to come into contact with the top face 1d of the label in the flattened state 1c.

In the following step shown in FIGS. 13 and 14, the suction cups 33 and 34 that have been secured to the top face of the label by suction, are driven in a return direction by the rod 32, i.e. with vertically upward motion 39 by the actuator 30, and the side suction cups 31 are activated to favor adhesion to that one of the side walls of the label 1b which tends to deploy under the effect of the traction force exerted by the suction cups 34 and 33, The walls of the label can come into contact with the curved arm portions 37 serving to support the side suction cups 31; in this step, the suction cup 19 fitted to the actuator 21 is deactivated so as to release the zone of the label to which it was previously adhered.

In the following step corresponding to that which is shown in FIGS. 15 and 16, the blower means 35 fitted with air-blow nozzles 35a are moved along arrow 50, e.g. in horizontal translation, by the actuator 36 so as to take up a position substantially on the longitudinal axis 6 on the at-least partially deployed label 1b, inside the label so as to blow the jet of air via the nozzles 35a so as to favor or complete deployment of the label, causing it to return to its initial and/or final shape, particularly its frustoconical or cylindrical shape about the longitudinal axis 6.

With reference to FIGS. 17 to 20, the transfer means of the invention is designed to enable the shaped label 1b to be positioned around and engaged on a core-forming male part 91 of a mold portion 93; In the embodiment shown diagrammatically in the figures, the male portion 91 is frustoconical in shape, having an outside surface 92 around an axis of revolution 90 and terminated by a front end face 94 that is perpendicular to the axis 90; In the configuration shown in FIG. 17, the deployed label 1b is brought up to the male portion 91 of the mold 93, i.e. in such a manner that its own longitudinal axis 6 substantially coincides with the longitudinal axis 90 of the male portion 91, and its larger longitudinal end 1g being placed in the vicinity of the front face or longitudinal end 94 of the male portion 91.

The transfer apparatus has a first actuator 43 suitable for moving two actuators 40 and 44 parallel to the axes 6 and 90 by means of a rod or piston-forming element 43a; The actuator 40 is suitable for moving suction cups 41 and 42 that are secured to the rod 40a of the actuator 40 along a vertical axis; this makes it possible to move the suction cups 41 and 42 radially relative to the longitudinal axes 6 and 90. The actuator 44 is suitable for moving an abutment 45 secured to the rod 44a of the actuator 44 in translation parallel to the axes 6 and 90.

Figure 17:
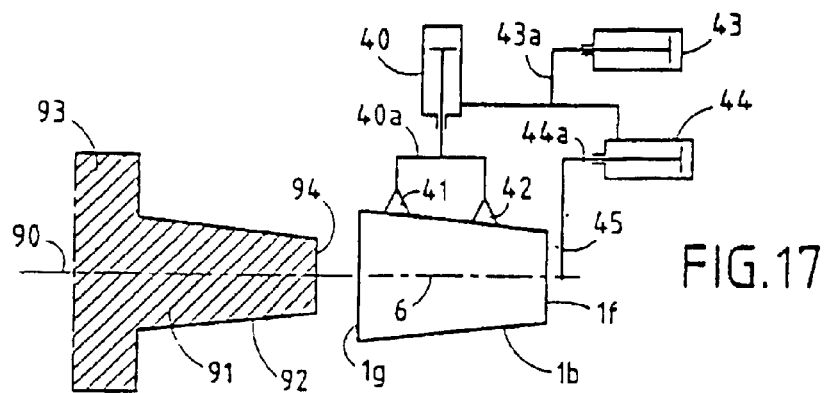
FIGS. 17 to 20 are diagrammatic side views of a portion of the means for transferring expanded labels in a receptacle-manufacturing apparatus of the invention for the purpose of engaging an expanded label around the core of a mold.

In a first transfer step, the transfer means shown in FIG. 17 and supporting the shaped, joined-together, and deployed label 1b is moved by conventional means (not shown) so that the label 1b supported by the suction cups 41 and 42 secured to the rod 40a is placed in line with and facing the male portion 91 onto which it is to be placed.

Figure 18:
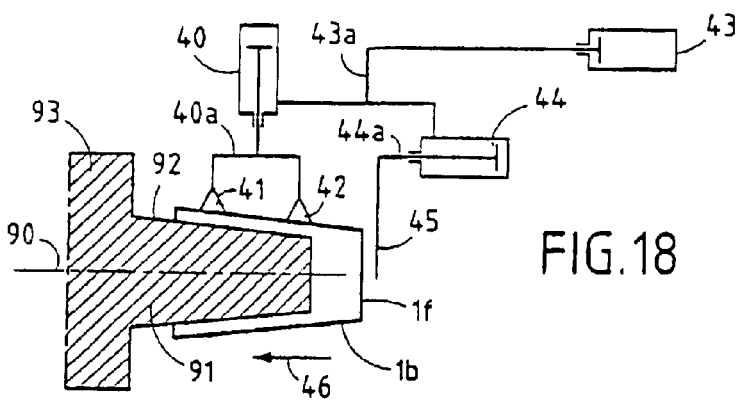

In the following step corresponding to FIG. 18, the actuator 43 is activated to move the actuators 40 and 44 along arrow 46, thereby correspondingly moving the label 1b which is held by the suction cups 41 and 42, i.e. moving it axially along the common axis 6, 90 of the label and the male portion 91 of the core, until the label is engaged at least in part on the core, as shown in this figure.

Figure 19:
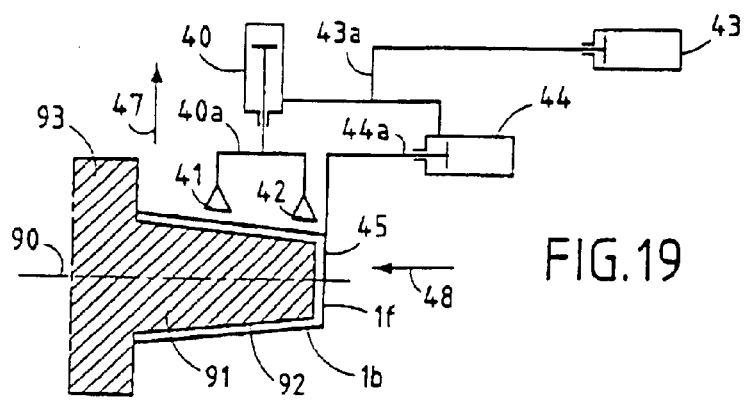

The following step corresponds to FIG. 19, in which the suction cups 41 and 42 are deactivated and are retracted radially along arrow 47 under drive from actuator 40 until the label 1b has been engaged more fully on the male portion 91 of the core by drive from the actuator 44 moving the abutment 45 along arrow 48 by contact (pressing) between the abutment and the rear longitudinal end 1f of the label 1b.

Figure 20:
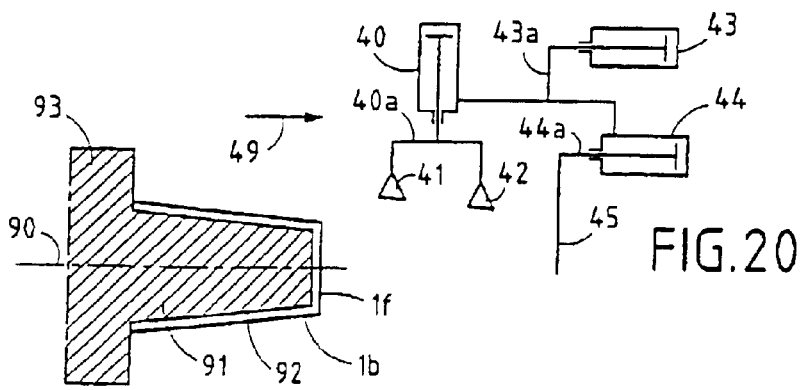
Figure 21:
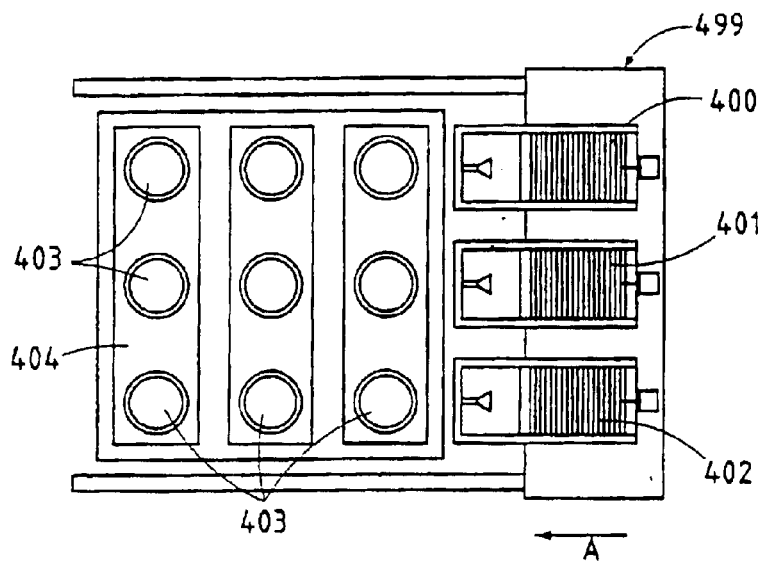
FIGS. 21 to 30 show successive steps of simultaneously extracting three labels from a magazine, expanding all three labels and depositing them on an intermediate transfer support.
Figure 23:
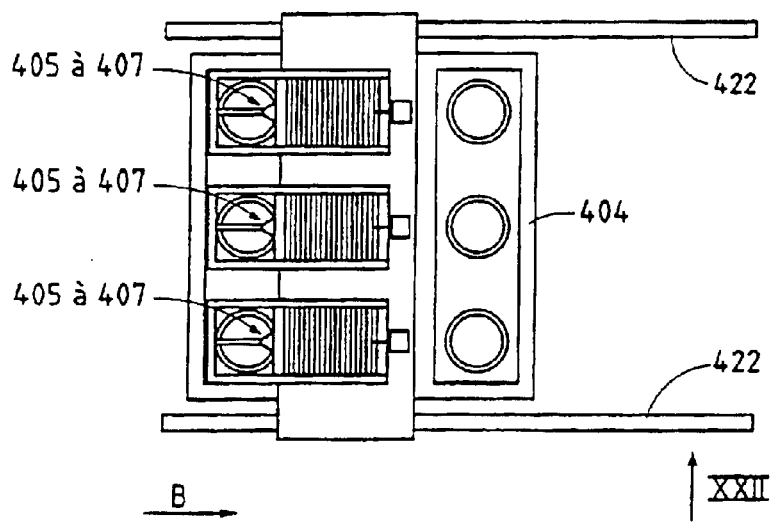

In the final engagement step shown in FIG. 20, the deployed label 1b has been put into position and fully engaged on the male portion 91, and the transfer means 43, 40, and 44 in particular are disengaged along arrow 49 to take up a position in which they can be moved to go and take hold of a new label.

Figure 3:
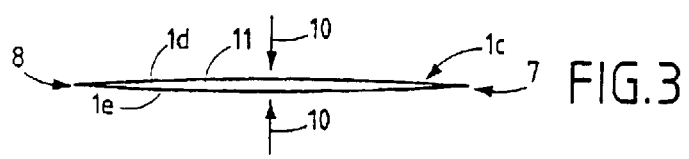
FIGS. 3 and 4 are respectively a profile view and a plan view of a label as shown in FIG. 2 after the operation of joining together its free edges and then flattening it is performed after.

Although it is preferable to store the label in its flattened (folded) shape as shown in FIGS. 3 and 4, it can be envisaged in some cases to store the frustoconical labels in their "final" shape (i.e. their deployed shape) as shown in FIG. 2.

FIGS. 21 to 30 show the successive operations of taking labels in the form of folded or flattened tubes or sleeves from three respective magazines, of expanding the labels, and of placing them on an intermediate support which is fitted with nine conical members each suitable for receiving one sleeve or tube.

The carriage 499 on which the magazines 400, 401, and 402 are secured moves (arrow A, FIG. 21) towards the first row (on the left) of vertical-axis cones 403 for shaping the labels that are fitted to the intermediate support 404 that is in the form of a square plate.

Figure 22:
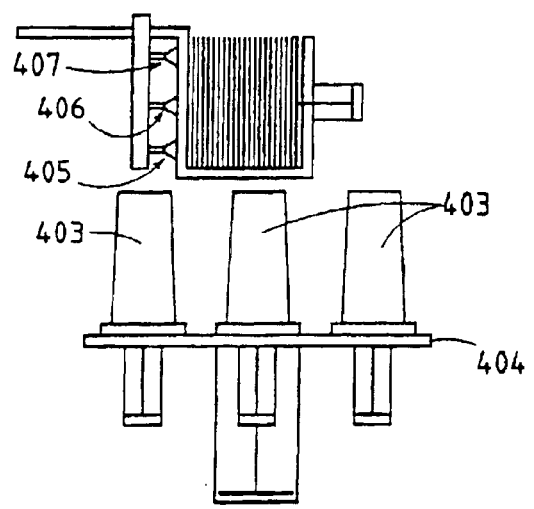

Three pneumatic gripping means 405, 406, and 407 fitted to the magazines 400, 401, and 402 respectively are actuated to take hold of respective flattened tubes from the magazines while moving in the direction of arrow B (FIG. 22).

The gripping means returns (arrow C, FIG. 24) to its initial positions while maintaining its vacuums, thereby causing three sleeves 408 to expand.

Three pre-forming cones 403 are advanced (arrow D, FIG. 26) into the three sleeves 408 respectively placed in line with each of the three cones, under drive from an actuator 409 fitted to the support 404.

The vacuum supply to the pneumatic gripping means 405 to 407 (suction cups) is switched off, and the row of three pre-forming cones returns under drive from the actuator 409 to its original position, with each of the cones 403 of the row carrying a respective sleeve 408.

Figure 24:
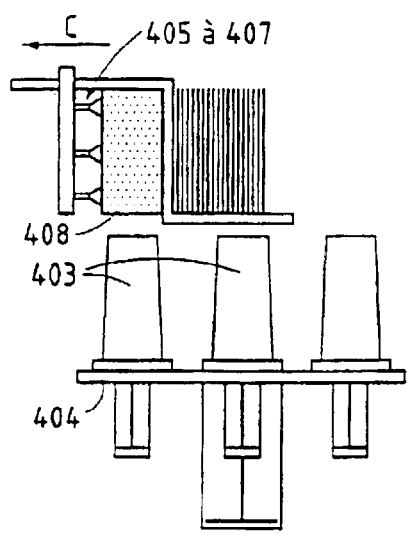
Figure 25:
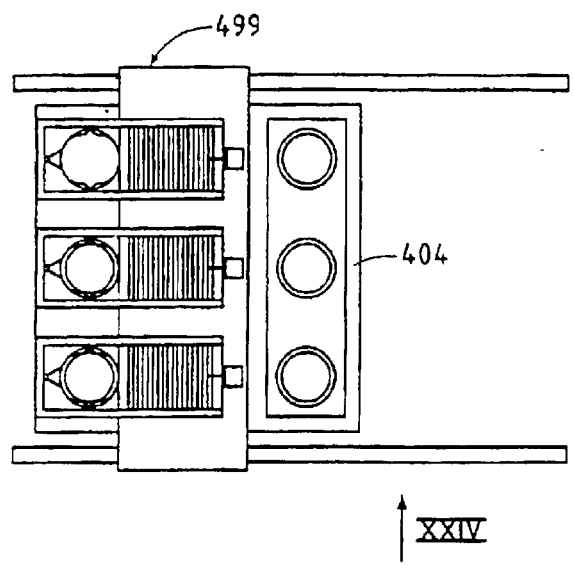
Figure 26:
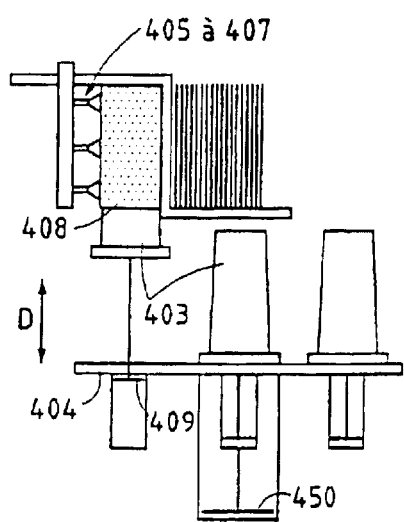
Figure 27:
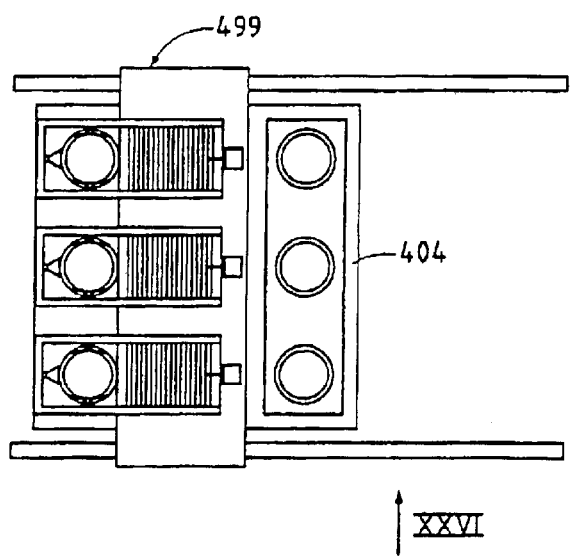
Figure 28:
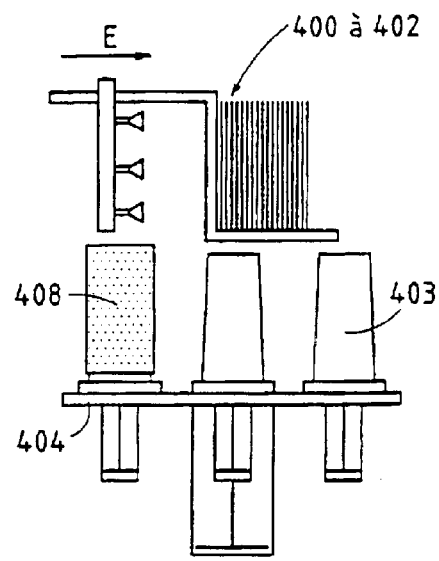
Figure 29:
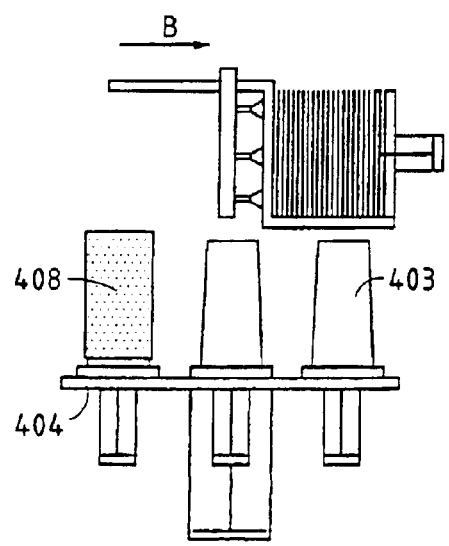
Figure 30:
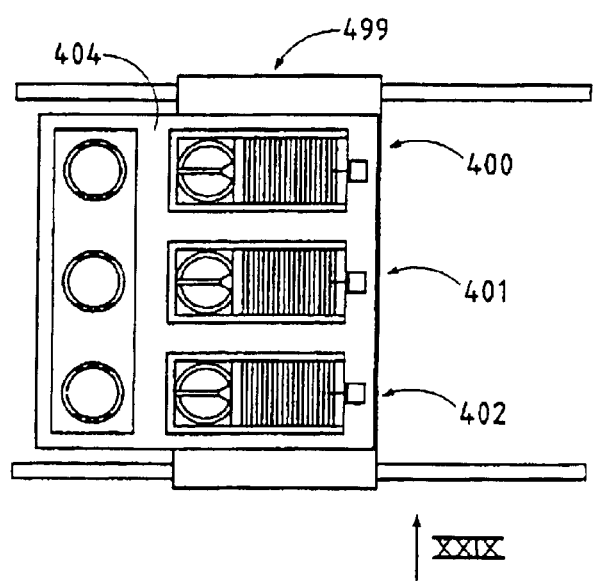

The carriage 499 on which the magazines are secured moves (arrow E, FIG. 28) towards another row of shaping cones, and a new cycle of gripping and removing tubes and of shaping them is started by successive movements along arrows B, FIG. 29, then C, FIG. 24, then D, FIG. 26, and E, FIG. 28.

Figure 31:
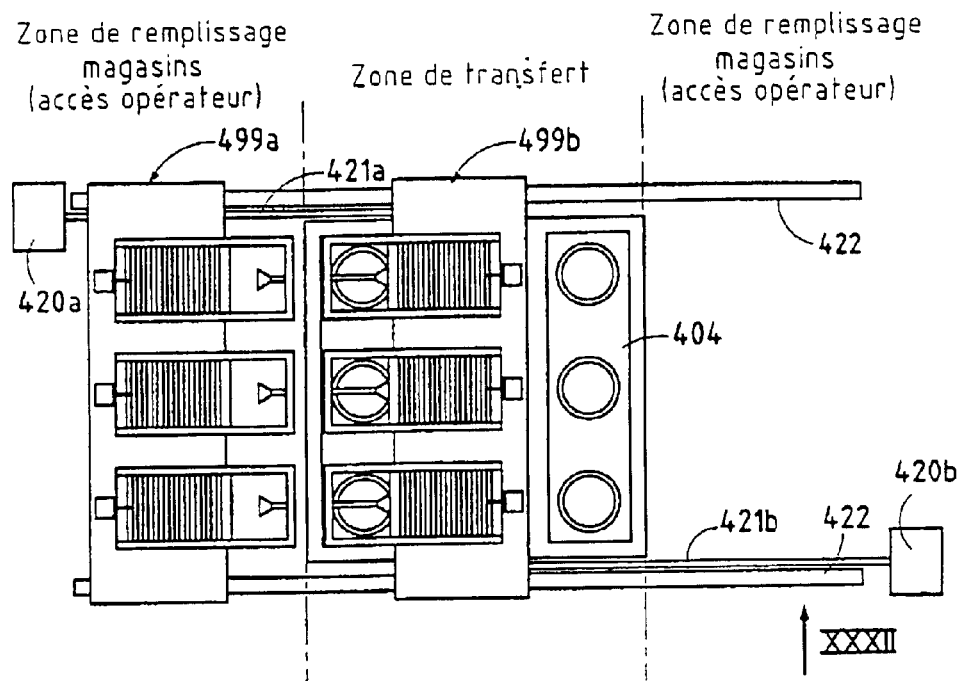
FIGS. 31 and 32 show a variant embodiment of the means for storing, delivering, and depositing sleeve labels on an intermediate temporary support.
Figure 32:
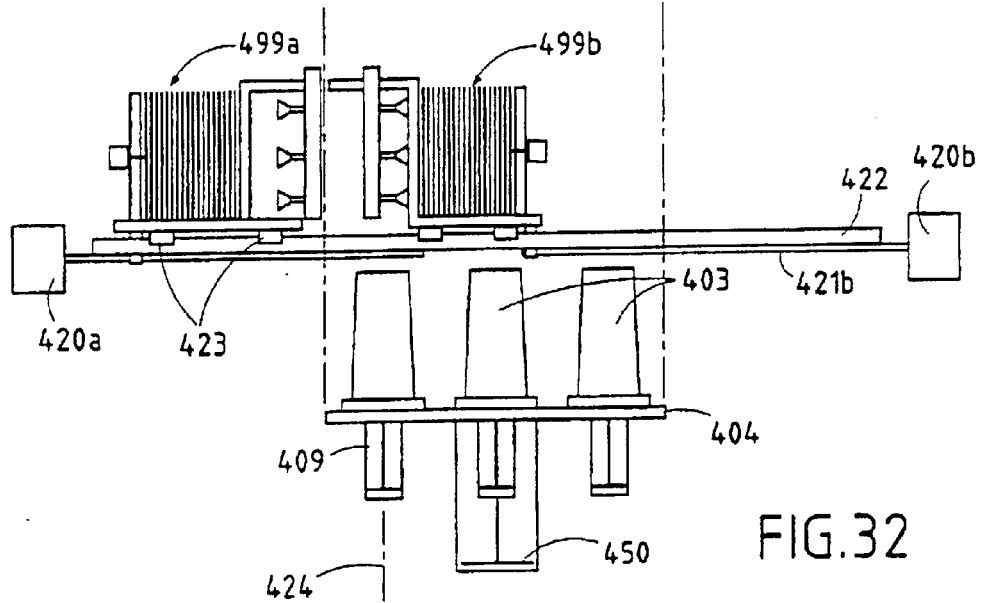

In a variant embodiment of the apparatus for removing and shaping labels as shown in FIGS. 31 and 32, a central transfer zone is fitted with an intermediate transfer support 404 provided with cones 403, and on either side of said transfer zone, there is provided a magazine filler zone that is accessible to an operator.

With reference to these FIGS. 31 and 32, each of two carriages 499a and 499b is driven by a respective motor 420a, 420b rotating a respective wormscrew 421a, 421b, with each carriage 499 moving on slideways 422 via skids 423.

As shown in FIG. 32 in particular, the conical structures 403 fitted to the support 404 can be mounted to move relative to the plate 404 by the actuator 409 in translation along the vertical axis 424 as described above, and also in rotation about said axis 424, making it possible in this case to rotate the conical shape 403, thereby orienting the sleeve-shaped label placed on the structure 403 so that the joint in the label occupies a predetermined angular position.

Figure 33:
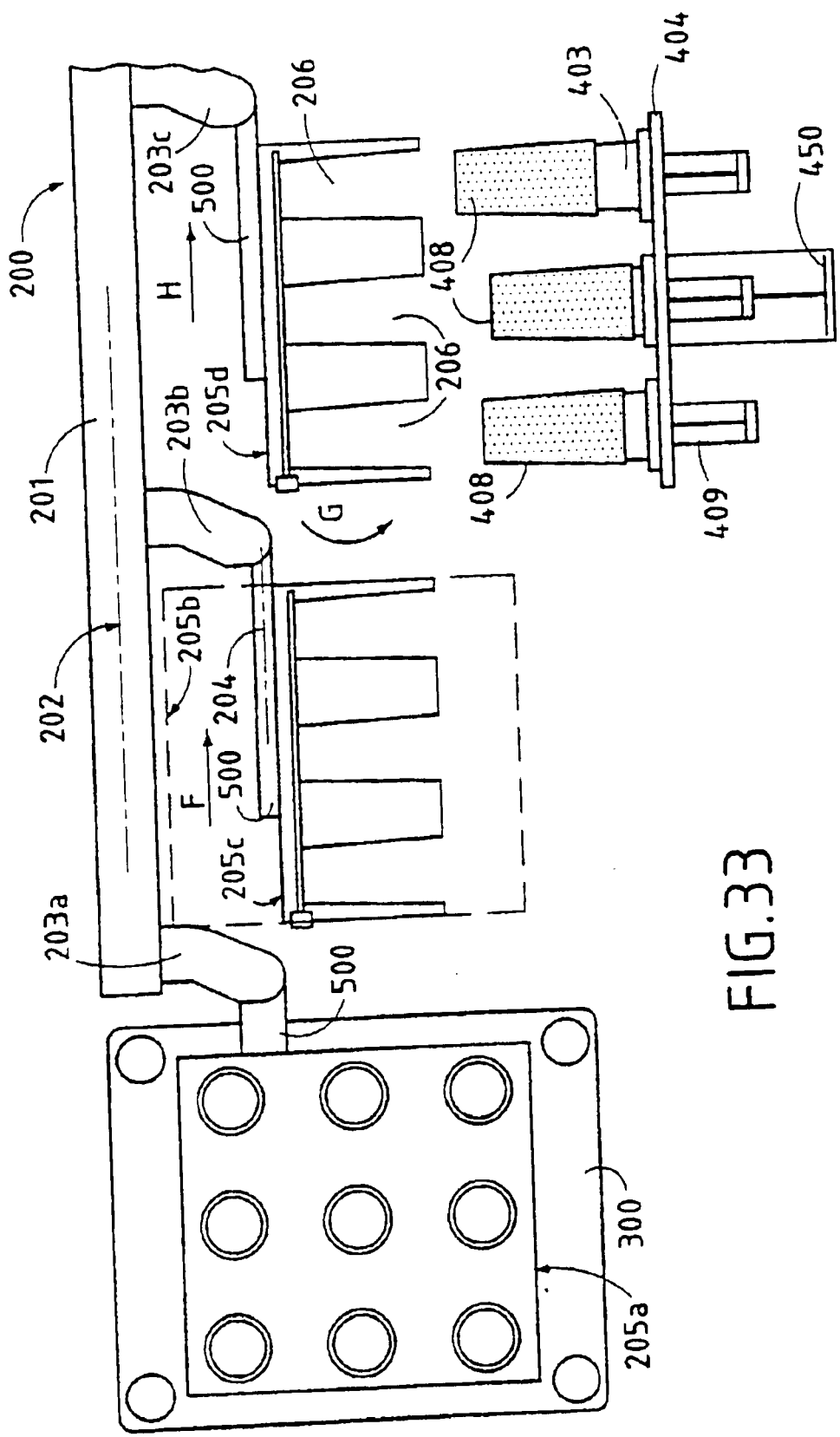
FIGS. 33 to 36 are a diagrammatic side view of the means and the successive operations involved in transferring sleeve labels from the intermediate support 404 on which they are placed by the operations described with reference to FIGS. 21 to 32, to the mold by means of a moving transfer support that receives a plurality of labels, enabling nine labels to be transferred simultaneously to the mold.

With reference to FIGS. 33 to 36, the moving means for transferring a plurality of labels comprises a robot 200 fitted with a beam or arm 201 having a longitudinal axis 202, e.g. a horizontal axis, which beam 201 carries an arm 203 that is movable in translation along said axis 202, said arm 203 carrying a second arm 500 which is mounted to move relative to arm 203b along a horizontal axis 204, e.g. parallel to the axis 202; The second arm 500 receives a support plate 205 fitted with nine cells which serve to transfer nine sleeve-shaped labels from the intermediate support 404 where they have been placed using the steps as described above to a mold-forming part of the injection press 300; In FIG. 33, three positions corresponding to successive steps of the displacement are shown: in the position of the arm 203 that is referenced 203a, the arm supports the plate 205 in a position where it is in register with the male and female portions of the mold fitted to the press 300; By moving in translation along arrow F, the arm 203 reaches the position referenced 203b in which rotation about the axis 204 as referenced by arrow G causes the plate to pass from position 205b to position 205c by rotating through 90°; subsequent movement in translation along arrow H brings the arm 203 into the position referenced 203c in which the plate 205, now referenced 205d, is in register with the intermediate support 404 carrying the nine sleeves 408 to be transferred into the mold fitted with nine cores and matrices.

Figure 34:
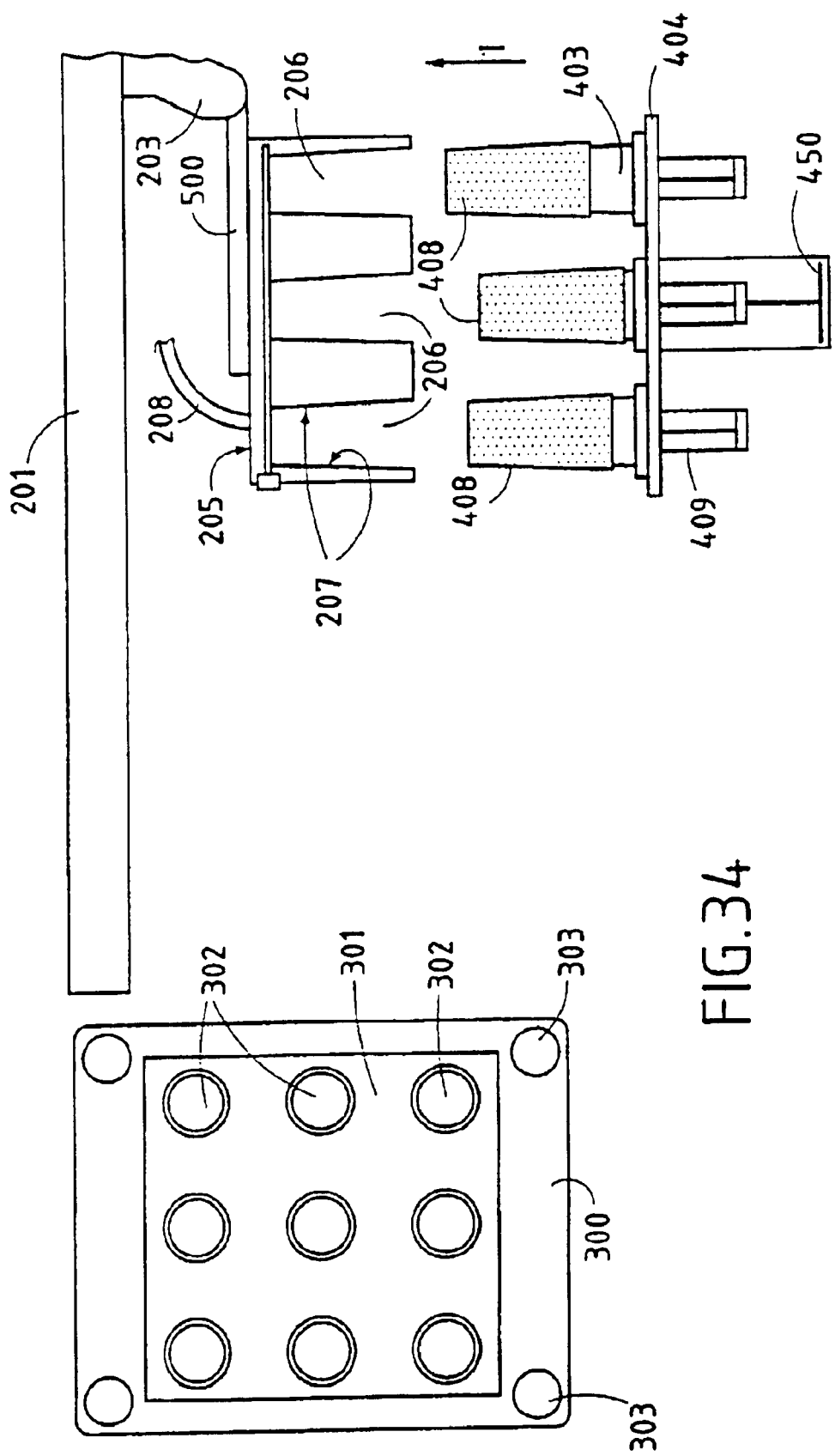

To this end, as shown more particularly in FIG. 34, the plate 205d is provided with cells or cavities 206 whose walls 207 are of a shape that substantially matches the outside shape of a sleeve-shaped label, which walls 207 can have suction applied thereto by means of a vacuum source connected to the plate 205d by a pipe 208 shown in part and diagrammatically.

Figure 35:
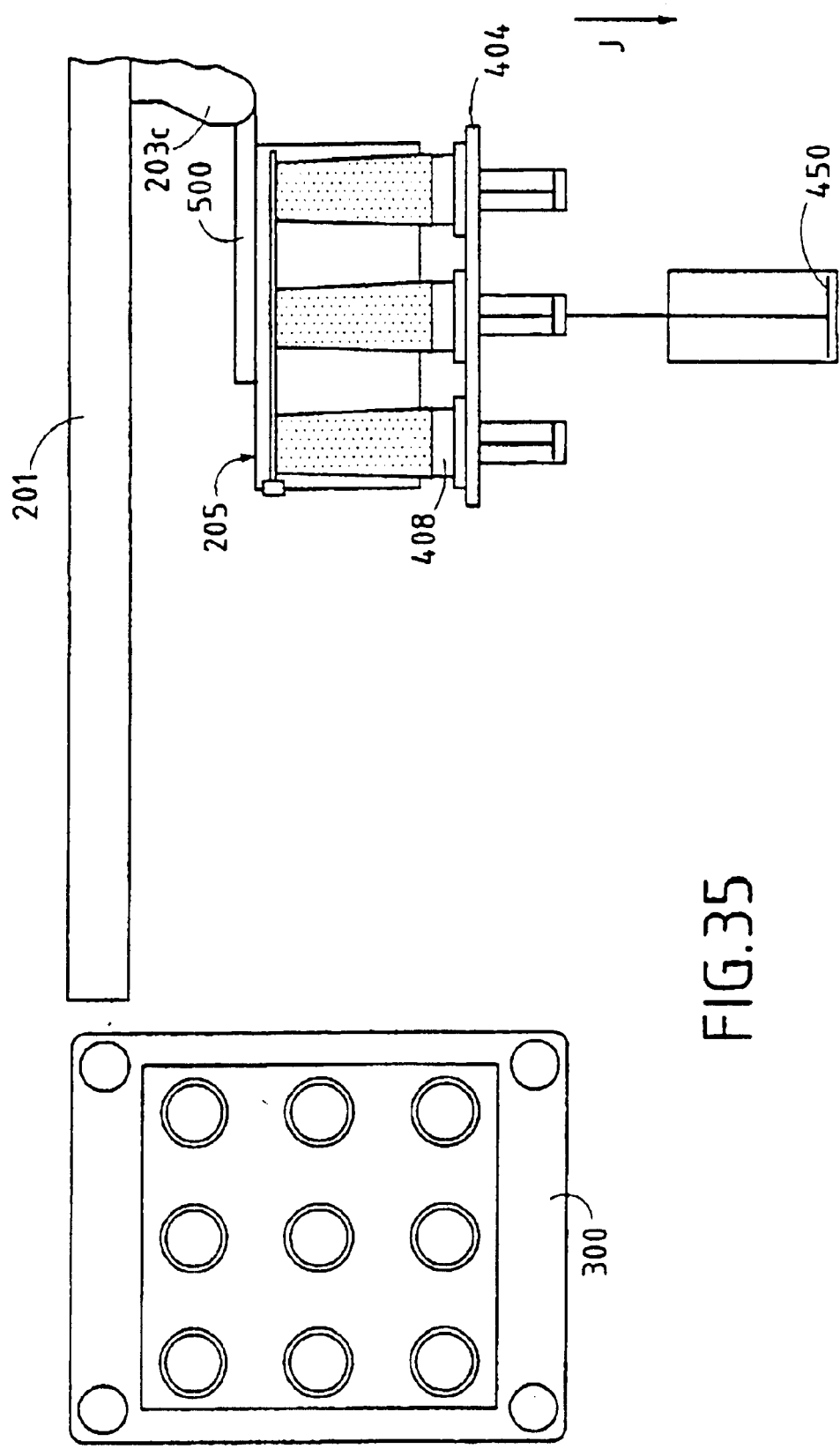

In the following operations, the intermediate support 404 and the sleeve 408 that it carries move vertically along arrow I under drive from the actuator 450 until the sleeves 408 are housed in the cavities 206 of the plate 205d, corresponding to the position shown in FIG. 35; Suction is applied to the walls 207 so as to hold the labels in the cells 206.

Figure 36:
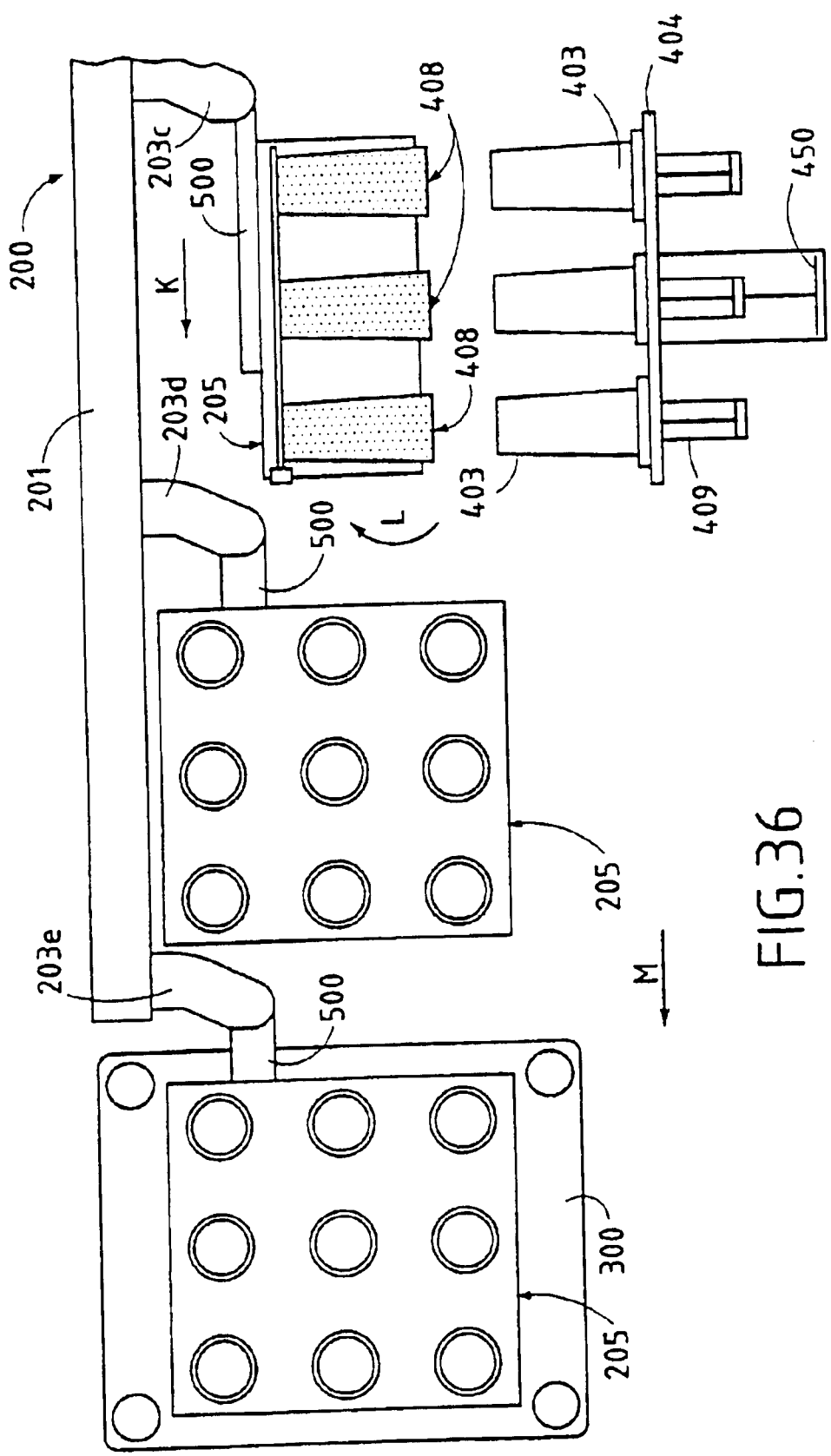

Thereafter, movement of the support 404 under drive from the actuator 450 along arrow J (FIG. 35) brings the support 404 into the position shown in FIG. 36; in this state, the plate 205 is subsequently moved by the arms 203 and 500 which support it along arrows K, L, and M in succession, with the arm 203 passing successively through the positions referenced 203c to 203d and then 203e in FIG. 36, i.e. it follows movements that are the reverse of those shown diagrammatically in FIG. 33. This enables nine sleeve-shaped labels that are held pneumatically to the recessed plate 205 to be transferred simultaneously and positioned in register with the cores 302 of the mold 301 situated in the press 300 that is fitted with columns 303.

The storage and transfer structure that includes the moving magazine 499, the gripping means 405 to 407, the intermediate support 403, 404, and the recessed plate 205 has the particular advantage of being suitable for use with all types of commercially-available robot 200.

What is claimed is:

1. A method of injection molding a receptacle fitted with a flat covering label having at least two edges and a thickness less than or equal to 80 microns, in which method the label is inserted into a mold prior to molding, the mold having a mold core, a mold matrix and a molding space between the core and the matrix, wherein the label is preshaped by sealing said at least two edges together, and the method comprises the successive steps of:

(i) gripping with movable pneumatic gripping means an outside face of the preshaped label having said at least two edges sealed together, said preshaped label being folded in a flat configuration;

(ii) reshaping the folded label in an unflattened rolled configuration with said movable pneumatic gripping means;

(iii) transferring and depositing the unflattened label onto the core by the movable pneumatic gripping means;

(iv) closing the mold; and (v) injecting plastics material in the molding space.

2. The method recited in claim 1, wherein the shaped label material has a thickness less than or equal to 50 microns.

3. The method recited in claim 1 wherein:

at step (i), when gripping said folded flat labels, said folded flat labels are stored in a stack of a magazine; and at step (ii), before reshaping said folded flat label, said folded flat labels are extracted from said stack by said movable pneumatic gripping means.

4. The method recited in claim 1, wherein a plurality of labels are transferred simultaneously to the gripping means.

5. The method recited in claim 1, further comprising the steps of:

engaging a portion of the shaped label around a mold core; and placing the label around the mold core with use of a thrusting member.

6. The method recited in claim 1, wherein the labels comprise paper.

7. The method recited in claim 1 wherein the labels comprise polypropylene.

8. An apparatus for injection molding a receptacle, comprising:

a mold having a male portion and a female portion for molding the receptacle; and movable pneumatic transfer means capable of depositing a label in the mold before molding the receptacle;

wherein said male portion is capable of receiving a covering rolled label having at least two edges sealed together and attaching said label to the receptacle;

wherein said movable pneumatic transfer means are capable of pneumatically gripping said label under a folded flat configuration by contacting an outside face of said label, reshaping said folded flat label into a rolled unflattened configuration, and depositing the said rolled label on said male portion of the mold; and wherein said apparatus further comprises means for deploying and expanding said label from the folded flat configuration the rolled unflattened configuration, said means expanding and deploying the side walls of said label from its inside.

9. The apparatus recited in claim 8 comprising:

a magazine for storing a group of flat labels in a stack wherein said folded flat labels have been shaped in a folded configuration; and the movable pneumatic transfer means capable of gripping said folded label in a folded flat configuration by contacting an outside face of said label within said stack; extracting said folded label from the stack; and reshaping said folded flat label in a rolled unflattened configuration.

10. The apparatus recited in claim 8, wherein said means for deploying and expanding said folded flat label comprises movable blowers suitable for blowing jets of air inside said folded label so as to complete deployment of said label and the movable pneumatic transfer means is capable of gripping said outside face of the label as the label expands to said unflattened state.

11. The apparatus recited in claim 8, wherein the movable pneumatic transfer means comprises a movable pneumatic transfer support element comprising a plurality of elements for holding the shaped and expanded label and for transferring a plurality of labels simultaneously into a multi-cavity mold.

12. The apparatus recited in claim 11, wherein the movable pneumatic transfer support element comprises a plurality of cells each operable to receive at least a portion of an expanded label.

13. The apparatus recited in claim 12, further comprising a robot operable to move the movable pneumatic transfer support element relative to an axis of rotation and an axis of translation.

14. The apparatus recited in claim 13, further comprising:

an element for engaging the expanded label in part of the mold core; and an element for thrusting the label into the core after the label has been engaged in a part of the core.

\* \* \* \* \*